United States Patent [19]

Tomita

[11] Patent Number: 4,679,097
[45] Date of Patent: Jul. 7, 1987

[54] METHOD OF RECORDING AND REPRODUCING VIDEO AND AUDIO SIGNALS ON A MAGNETIC TAPE

[75] Inventor: Masao Tomita, Neyagawa, Japan

[73] Assignee: Matsushita Electric Industrial Co., Ltd., Kadoma, Japan

[21] Appl. No.: 675,395

[22] Filed: Nov. 27, 1984

[30] Foreign Application Priority Data

Nov. 30, 1983 [JP] Japan .............................. 58-225933
Dec. 6, 1983 [JP] Japan .............................. 58-230130
Jul. 31, 1984 [JP] Japan .............................. 59-161713

[51] Int. Cl.$^4$ .......................................... H04N 5/782
[52] U.S. Cl. .................................. 358/328; 358/330; 360/19.1
[58] Field of Search .............. 358/328, 327, 330, 343, 358/310; 360/19.1, 21, 33.1, 64

[56] References Cited

U.S. PATENT DOCUMENTS

| 3,846,819 | 11/1974 | Warren | 358/328 |
| 3,925,816 | 12/1975 | Kihara | 358/328 |
| 3,956,769 | 5/1976 | Beecroft et al. | 360/77 |
| 4,296,430 | 10/1981 | Warren | 358/328 |
| 4,380,779 | 4/1983 | Kitamura et al. | 360/19.1 |
| 4,390,906 | 6/1983 | Furumoto et al. | 360/19.1 |
| 4,542,419 | 9/1985 | Morio et al. | 360/19.1 |

FOREIGN PATENT DOCUMENTS

| 87114 | 8/1983 | European Pat. Off. | 360/19.1 |
| 55-77012 | 6/1980 | Japan | 360/19.1 |

Primary Examiner—Donald McElheny, Jr.
Attorney, Agent, or Firm—Wenderoth, Lind & Ponack

[57] ABSTRACT

A magnetic recording and reproducing method, applicable to a magnetic recording and reproducing apparatus such as a video tape recorder. The method comprising the steps of recording a first signal in a magnetic layer of a magnetic tape by a first head, recording a second signal which is preferably a digital signal in a shallower portion of the first signal recorded magnetic layer by a second head having a different azimuth from that of the first head. The width of the shallower portion is preferably narrower than the width of the first signal recorded magnetic layer. The recorded first and second signals are reproduced by heads having different azimuth from each other, respectively, so as not to interfere with each other.

22 Claims, 8 Drawing Figures

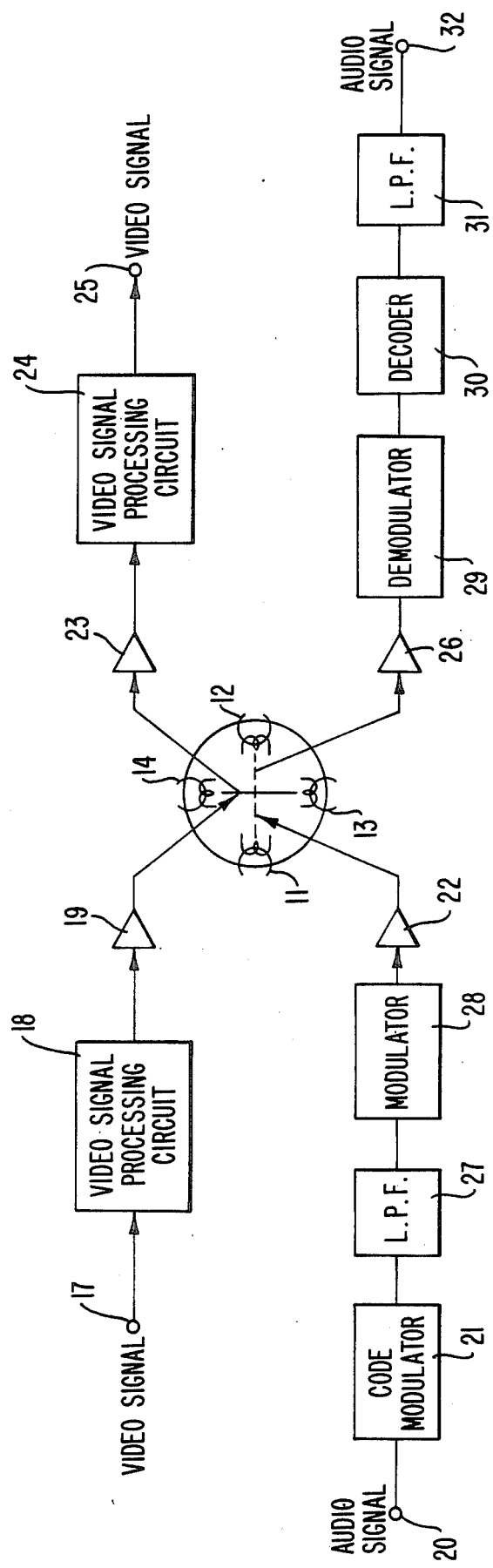

METHOD OF RECORDING AND REPRODUCING VIDEO AND AUDIO SIGNALS ON A MAGNETIC TAPE

BACKGROUND OF THE INVENTION

1. Field of the Invention

This invention relates to a magnetic recording and reproducing method, applicable to a magnetic recording and reproducing apparatus such as a video tape recorder (VTR, hereafter).

2. Description of the Prior Art

In the most popularly used conventional magnetic recording and reproducing method, used for such as rotary head type VTRs, video signals are recorded on video tracks by rotary video heads having different azimuth angles and audio signals are recorded on audio tracks by static audio heads. Almost all area of the tape surface is used for the video and audio tracks. Accordingly, efforts for improving the recording density at the surface have been made by reducing the wavelength of the signal to be recorded or the track width.

Recently, on the other hand, a method for recording a frequency-modulated audio signal on a video track has been developed to improve the performance of audio signal recording. Frequency allocation in this recording method is shown in FIG. 1, and a sectional view of the recorded magnetic tape is shown in FIG. 2. Referring to FIG. 1, reference numeral 1 is a frequency-modulated luminance signal including the synchronous signal; 2 is a chrominance signal with its frequency converted to low frequency band; and 3 is a frequency-modulated audio signal. The audio signal 3 is allocated between the frequency-converted chrominance signal 2 and the frequency-modulated luminance signal 1, and recorded on a magnetic tape by an audio head having a different azimuth from that of a video head.

Referring to FIG. 2, the frequency-modulated audio signal is first recorded in a deep layer 4a of a magnetic layer 4 by a recording current larger than a recording current for recording the video signal, and thereafter the video signal is recorded in a shallow layer 4b. Reference numeral 5 is a basefilm. Since the frequency-modulated audio signal is recorded, signal-to-noise ratio of the audio signal is high. Further, the quality of the audio signal is not degraded even if the tape speed is lowered to, for example, a third of the normal tape speed. This feature is advantageous for long-time recording. Also, it is significant that the deep layer of the magnetic layer is used for recording.

However, there are some problems in the above described conventional method.

First, since a large current must be applied to the audio recording head to record the frequency-modulated audio signal in a deep layer, the recordable frequency band is restricted to relatively lower frequency band. Consequently, the method cannot be used for the pulse-code modulation (PCM) recording system which provides a quality better than the frequency-modulation (FM) recording system, because the PCM recording requires a frequency band wider than that of the FM recording. Further, during reproducing the recorded video signal, a part of the audio signal recorded in the deep layer is also reproduced to interfere with the reproduced video signal. Further, the large current for recording the audio signal needs a large scale current supply circuit, and badly influences other video circuits.

Second, the so-called "after-recording" is impossible, which records or erases only audio signals on the magnetic tape on which video signals have already been recorded. Since the audio signal is recorded in the deep layer of the magnetic tape, it is impossible to erase or record only the audio signal the audio signal without erasing or affecting the video signal recorded in the shallow layer.

As described above, the multiplex recording method using a deep layer of magnetic layers of a magnetic tape has such problems that it is difficult to increase the record density and that it is impossible to rewrite the informations in the deep layer.

SUMMARY OF THE INVENTION

An object of the present invention is to provide a method for improving performance of a magnetic recording and reproducing apparatus such as a video tape recorder (VTR).

Specifically, an object of the present invention is to provide a method for increasing the recording density of magnetic recording.

Another object of the present invention is to provide a method for realizing digital recording such as the PCM recording of audio signal thereby to remarkably improving the quality of audio signal.

Still another object of the present invention is to provide a method for allowing the erasing and re-recording of audio signal without affecting the recorded video signal (after-recording).

These objects can be accomplished by a method comprising the steps of: recording a first signal in a magnetic layer having a predetermined track width by a first head; and recording a second signal in a shallower portion of the first signal recorded magnetic layer by a second head having a different azimuth from that of the first head; and reproducing the recorded first and second signals by heads having different azimuth from each other. The track width of the shallower portion is preferrably narrower than the track width of the first signal recorded magnetic layer.

This method is very advantageous to obtain a good quality of signal if the second signal is a digital signal. For example, if the first signal is an analog video signal and the second signal is a digital audio signal such as a pulse-code-modulated (PCM) audio signal, the sound obtained by reproducing the second signal has a remarkably high fidelity. Also, the digital audio signal recorded in the shallower portion of magnetic layer can be easily erased and replaced by a new digital audio signal without affecting the video signal recorded in the deeper portion of magnetic layer.

BRIEF DESCRIPTION OF THE DRAWINGS

FIG. 8 is a principal portion brock diagram showing an embodiment of this invention.

DESCRIPTION OF THE PREFERRED EMBODIMENT

Figure 1:
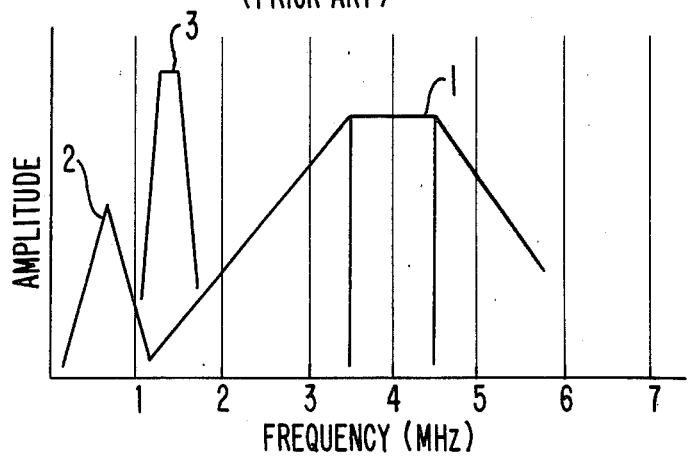
FIG. 1 is a frequency allocation diagram of the conventional magnetic recording and reproducing method.
Figure 2:
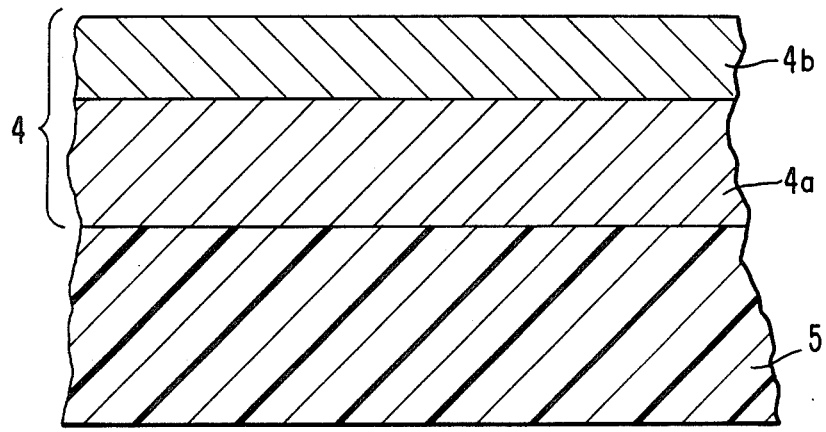
FIG. 2 is a sectional view of a magnetic tape showing how two signals are recorded therein according to the conventional method.
Figure 3:
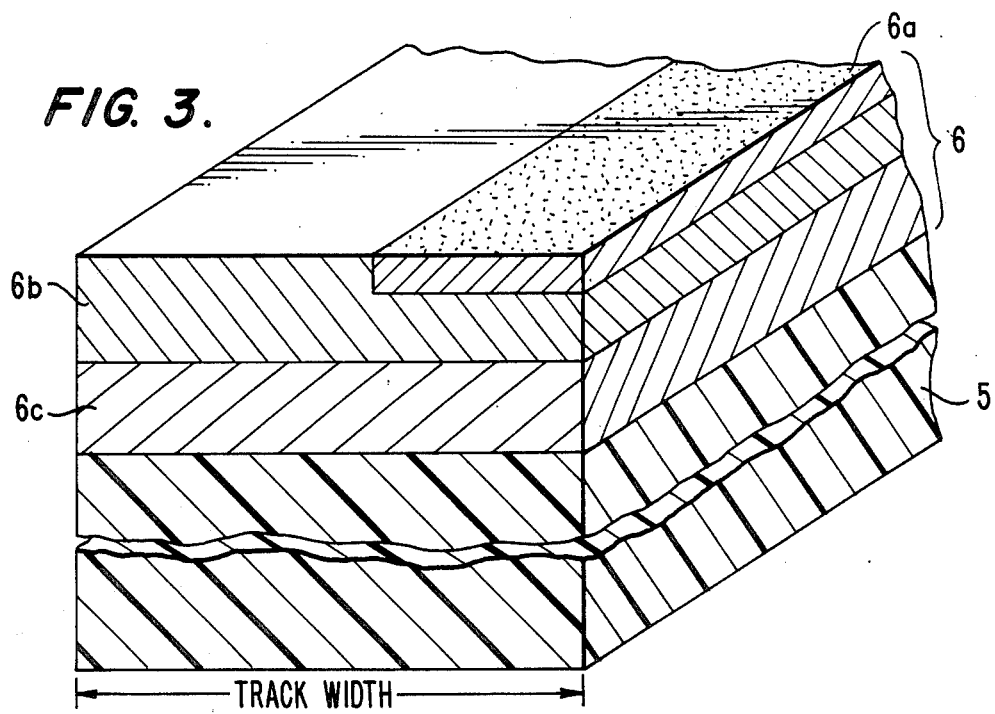
FIG. 3 is a perspective sectional view of a magnetic tape showing how two signals are recorded therein according to the present invention.

FIG. 3 shows how video and audio signals are recorded on a magnetic tape. Generally, when a video signal is recorded on the magnetic tape by applying a usual optimum recording current to a rotary head, the video signal is recorded in a layer extending to a depth of 0.25–0.30 times the recording wavelength, or 0.3–0.8 μm from the surface of the magnetic tape in the case of the usual consumer VTR. Since the thickness of a magnetic layer 6 of the usual magnetic tape is 2–4 μm, an unrecorded layer 6c exists as shown in FIG. 3. In the conventional method described above by referring to FIGS. 1 and 2, this unrecorded layer is used for recording a signal having a relatively long wavelength (i.e. in a low-frequency band). For recording a signal extending over a wide frequency range, it is better to record the signal in a shallow portion of the magnetic layer. Actually, the video signal is recorded in the relatively shallow layer.

The important point of this invention is that the signal-to-noise ratio (S/N) needs not be so high in the case of recording and reproducing a digital signal compared with the case of recording and reproducing an analog signal, and therefore a digital signal, which has a wide frequency band, can be recorded in a shallower portion 6a of the video signal recorded layer 6b, the track width of this shallower portion 6a being made narrower than the track width of the video signal recorded track 6b.

If the S/N of the recorded digital signal is 15 dB, the code error rate, when the digital signal is reproduced, is about $10^{-5}$ which is nearly a practical value. The S/N of 20–30 dB is practical enough for recording digital signals. Accordingly, the depth of the digital signal recording layer may be determined so that the S/N of the digital signal is 20–30 dB.

The S/N of the video signal (which is an analog signal) recorded in the portion 6b must be as high as possible so as to obtain a good quality of reproduced picture. Since part of the video signal recorded in the portion 6a is replaced by the digital signal, the video signal, when reproduced, is somewhat deteriorated. This deterioration of the video signal must be reduced to the minimum. One method for it is to make the recording domain of digital signal to be as shallow as possible. But, more effective method is to leave a part of the surface area of the video signal recorded layer unreplaced by the digital signal because the surface area is made in direct contact with the magnetic head and therefore largely contributes to the reproduced signal level. In other words, the video signal recorded layer 6b, after a digital signal was recorded in the layer 6a, has a step-like shape in section.

Figure 4:
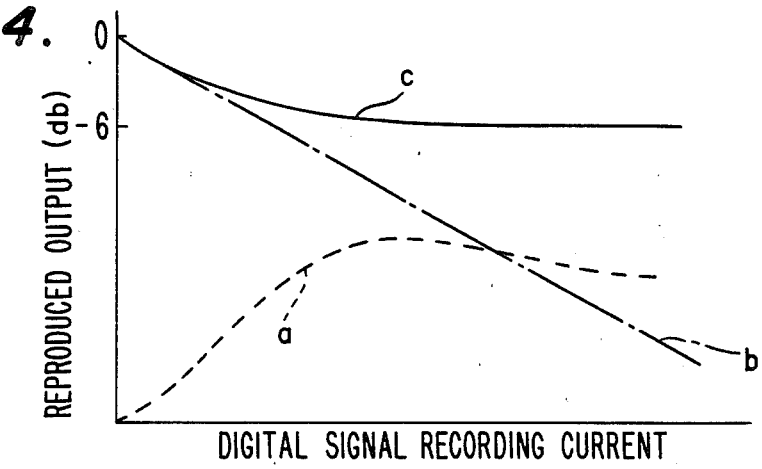
FIG. 4 is a graph showing a relationship between the reproduced signal level and the recording current.

FIG. 4 shows the relation of the reproduced output levels of the digital signal a and the video signal b and c, with respect to the digital signal recording current. The reproduced output level of the digital signal increases with the increase of the recording current until the recording current reaches a specific amount, but, when the recording current exceeds the specific amount, gradually decreases with the increase of the recording current.

The symbol b shows the reproduced output level of the video signal when the digital signal is recorded in a shallow layer extending to cover the full track width of the video signal recorded track. The reproduced output b of the video signal decreases with the increase of the digital signal recording current. This means that the portion of the recorded video signal replaced by the digital signal extends in the depth direction with the increase of the digital signal recording current. The symbol c shows the reproduced output level of the video signal when the digital signal is recorded in a shallow layer a track width of which is a half the track width of the video signal recorded track. In this case, even if the digital signal recorded depth reaches the full depth cf the video signal recorded layer by increasing the digital signal recording current, a half the originally recorded video signal remains unreplaced by the digital signal. Accordingly, the reproduced output level of the video signal remains at 6 dB lowered level. In other words, by restricting the track width for recording the signal in the shallow layer to be narrower than the track width for recording the signal in the deep layer, the reduction of the reproduced signal level of the signal recorded in the deep layer can be avoided.

Since the S/N of the digital signal may be 20–30 dB, the track width of the digital signal recording layer can be $\frac{1}{3}$–$\frac{1}{4}$ of the full track width of the video signal recorded layer, where the reduction of the reproduced output level of the video signal is at most 2–3 dB. Actually, since the part of the video signal recorded under the digital signal recorded layer also contributes to the reproduced output level of the video signal, the reduction of the reproduced output level of the video signal is at most 1–2 dB.

Further, since the digital signal is recorded in the shallow layer, the modulation noise which is produced by the surface nature of the tape does not practically affect the reproduction of the video signal. As a result, it is possible to substantially eliminate the S/N reduction of the video signal.

As described above, it is possible to record a digital signal having a practically acceptable code error rate on a previously recorded analog signal without deteriorating the analog signal. The track width can be selected so as to satisfy the above described relationship. The depth of the digital signal recording layer can be controled by, for example, the recording current. If the video signal is recorded by the optimum recording current to obtain the maximum reproduced level of the video signal, the recording current for recording the digital signal can be about $\frac{1}{5}$–1/6 of the optimum recording current for recording the video signal.

In addition, the gap length of the head for recording and reproducing digital signal which is recorded in the shallow layer is preferably shorter than that of the head for recording and reproducing video signal which is recorded in the deep layer. For, the depth of the recording layer depends also on the gap length of head. This is also advantageous for recording a digital signal, which has a wide frequency range, or short wave lengths.

When the frequency band occupied by the video signal is far separated from that occupied by the video signal, the both signals, when reproduced, can be easily separated by a filter. However, when the two signal, bands are adjacent to each other or overlaped, it is necessary to make the azimuth angle of the rotary head for the video signal to be different from that for the digital signal. Generally, it is known that the following loss L is caused when the gap direction of the reproducing head is inclined to the gap direction of the recording head at an angle of θ.

$$L = 20 \log \left[ \frac{\sin\left(\frac{\pi W}{\lambda} \tan \theta\right)}{\frac{\pi W}{\lambda} \tan \theta} \right] \text{(dB)} \quad (1)$$

where,
W: track width
λ: recording wavelength

Accordingly, it is possible to select the azimuth angle of the rotary head for video signal so as to reproduce only the video signal without picking up the signal recorded in the recording domain 6a of digital signal, and to select the azimuth angle of the rotary head for digital signal so as to reproduce only the digital signal without picking up the signal recorded in the recording domain 6b of video signal. For example, by making the azimuth angles of the video signal head and the digital signal head to be different by 30° from each other, the frequency band of the two signals can share the same frequency band of more than 1.5-2 MHz, with practical track widths.

Figure 5:
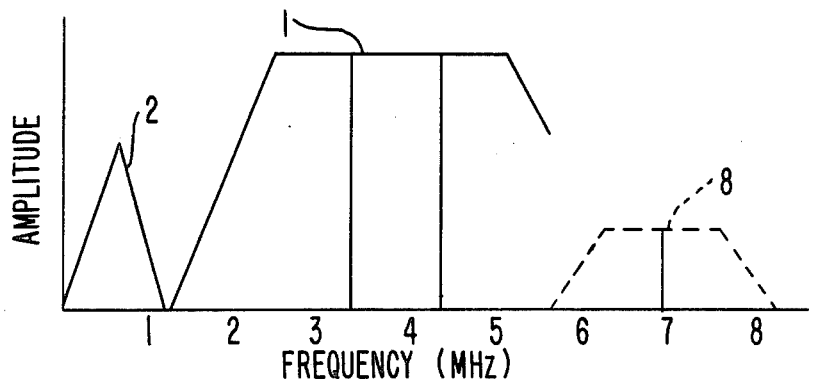
FIGS. 5 and 6 are frequency allocation diagrams according to the present invention.

FIG. 5 shows an example of frequency allocation according to this invention. This frequency allocation allows the PCM audio signal recording by the existing consumer use VTR. The recordable frequency band is widened to higher frequency side by reducing the gap length of the head for digital signal. The audio signal is modulated by PCM, which provides the highest fidelity. The audio frequency band of 20KH₂ is converted to a 14 bit digital signal by an A-D converter. After the two channels (right and left channels) are combined, the digital audio signal is added with a code error correction bit, thereby to be a signal of 2 MB/sec bit rate. When this digital audio signal is converted to a NRz code, the base band can be made about 1 MHz. FIG. 5 shows the method for recording this PCM audio signal having the base band width of about 1 MHz.

The frequency-modulated luminance signal 1 and the chrominance signal 2 converted to low frequency band are frequency-multiplexed and recorded in the layer including the video signal recording layer 6b and the audio signal recording layer 6a. Thereafter, the PCM audio signal is amplitude-modulated to be the signal 8 which has a frequency band of 6-8 MHz in the digital signal recording domain 6a. In this way, the video signal and the amplitude-modulated PCM audio signal is recorded in layers on the same track. In this case, although the frequency bands of the video signal and the PCM audio signal are partly overlaped, one does not affect the other because of the above described azimuth loss during reproduction. The video signal is unnecessary component for the PCM audio signal. Especially, deviation part of the luminance signal is the biggest unnecessary component. In the example of FIG. 5, the modulated PCM audio signal 8, which is recorded at low level, can be separated by a high-pass filter (for example, more than 5 MHz). In this case, the deviation part of the luminance signal is more attenuated by the high-pass filter, so that the audio signal can be easily reproduced.

By the frequency-allocation shown in FIG. 5, deterioration of the S/N of video signal is not substantially caused, and the digital signal of about 2 MB/sec. can be recorded. This means that an audio signal can be converted to a PCM audio signal and recorded in digital signal form. The PCM audio signal provides higher fidelity than the recording method of frequency-modulated audio signal which was explained in connection with FIGS. 1 and 2. It is needless to say that the digital signal recorded in the layer 6a may be other digital information, but not be limited to the PCM signal. Further, the extension of the recordable frequency band is realized by using the metal tape.

Figure 6:
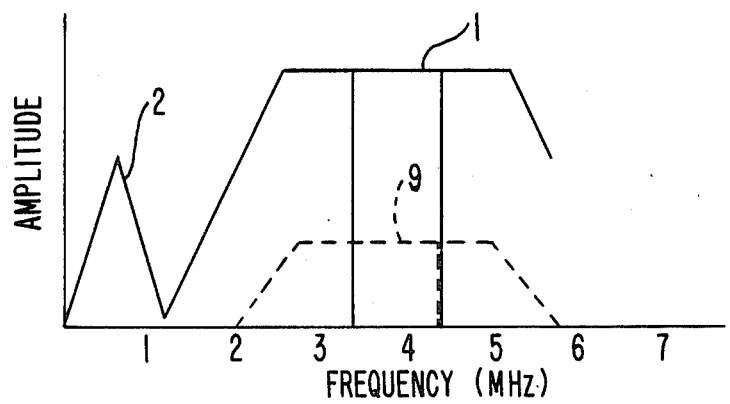

FIG. 6 shows another example of frequency allocation according to this invention. This example aims to realize the PCM audio recording within the recordable frequency band used in the conventional VTR. The PCM audio signal 9 having the frequency band of about 1 MHz is allocated in almost the same frequency band as that of the deviation of the luminance signal 1, and recorded in the digital signal recording layer 6a after the video signal has recorded. In this case, the PCM audio signal is frequency-modulated. The video signal can be separated from the frequency-modulated PCM audio signal by the azimuth loss, but if the azimuth loss is small, a cross tark arises to be a disturbance component. However, since the deviation part having a large disturbance component exists near the carrier frequency, both of the video signal and the PCM audio signal can be reproduced with few S/N deterioration due to the nature of triangle noise in frequency modulation.

This method can be applied to the consumer VTR having a narrow frequency band, because the PCM audio signal can be recorded without widening the recordable frequency band. Since the PCM audio signal is recorded in the form of frequency-modulation, many other features of frequency-modulation in magnetic recording can be effectively used.

In the above examples, although the digital signal of base band is amplitude-modulated or frequency-modulated, and the modulated digital signal is recorded in the shallow layer 6a of the track 6a and 6b on which the video signal is previously recorded the digital signal may be modulated in other ways of modulation.

Figure 7:
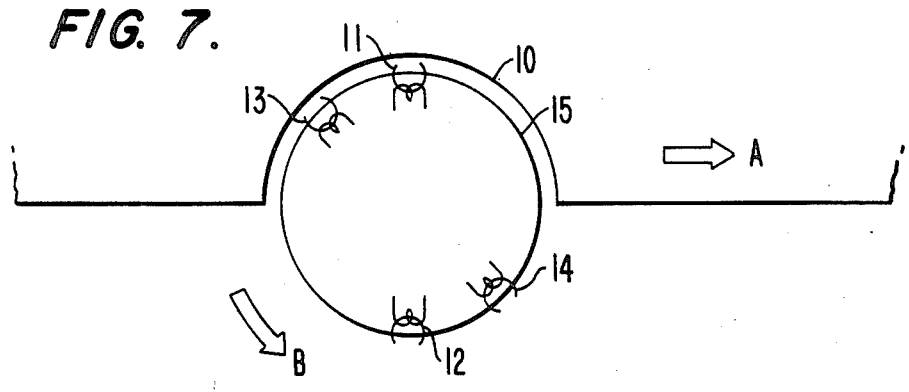
FIG. 7 is a schematic diagram showing an example of location of rotary heads according to the present invention.

FIG. 7 shows an example of rotary heads arrangement for realizing the magnetic recording and reproducing method of this invention. A magnetic tape 10 moves in the direction of an arrow A and a rotary cylinder 15 rotates in the direction of an arrow B at 30 Hz. This is the so-called rotary two-head helical type VTR. A video signal recording head 13 touches the tape before a digital signal recording head 11, and a video signal recording head 14 touches the tape before a digital signal recording head 12. As an example, the azimuth angles of the heads 13, 14 are +6° and those of the heads 11, 12 are +30°. The track widths of the heads 11, 12 are narrower than those of the heads 13, 14. By the above head arrangement, a video signal is first recorded on a track of the magnetic tape by the video signal recording head (13 or 14) and then a modulated digital signal is recorded in a shallow layer of the track by the digital signal recording head (11 or 12) having a different azimuth from that of the video signal recording head.

The video signal recording heads 13, 14 are applied with an optimum video signal recording current, and the digital signal recording head 11, 12 are applied with a current smaller than ($\frac{1}{2} \sim \frac{1}{3}$) the optimum video signal recording current. Accordingly, the digital signal is recorded in the shallow layer of the track, with the width of the shallow layer narrower than the video signal recorded track width.

FIG. 8 shows a brock diagram of a principal portion of an apparatus using, the method of this invention. A video signal is applied to an input terminal 17, processed at a recording side video signal processing circuit 18, amplified by a recording amplifier 19, and recorded on a magnetic tape by the rotary heads 13, 14. At the recording side video signal processing circuit 18, the luminance signal is frequency-modulated and the chrominance signal is converted to a low frequency band signal to be allocated respectively as shown in FIGS. 5 or 6. An audio signal applied to an input terminal 20 is pulse-code-modulated by a pulse-code modulator 21, and is restricted its frequency band to a necessary frequency band by a low-pass filter (LPF) 27. Then, the PCM audio signal having the necessary frequency band, is frequency-modulated by a frequency modulator 28 to be the signal 9 as shown in FIG. 6. The frequency-modulated PCM audio signal is amplified by a recording amplifier 22, and recorded on the magnetic tape by the rotary heads 11, 12.

The video signal and the frequency-modulated PCM audio signal recorded on the magnetic tape are reproduced by different heads having different azimuths. The video signal is reproduced by the rotary heads 13, 14. The reproduced video signal is amplified by an amplifier 23, and applied to a reproducing side video signal processing circuit 24, where it is demodulated to the original video signal, and outputted from an output terminal 25. The audio signal is reproduced by the rotary heads 11, 12. The reproduced audio signal is amplified by an amplifier 26, and demodulated to the PCM audio signal of the base band by a frequency 29. The demodulated PCM audio signal is decoded to the analog audio signal by a decoder 30, and, through a low-pass filter (LPF) 31, outputted from an output terminal 32.

In this way, the PCM audio signal is recorded in a layer at the shallower portion of the video signal recording track and having a width narrower than the track width of the video signal recording track. Accordingly, it is possible to reproduce the audio signal in good quality without deteriorating the video signal.

Further, since the digital audio signal is recorded in a very shallow layer close to the surface of the magnetic tape, it is easy to rewrite and erase the digital audio signal repeatedly by a small recording current. In other words, the after-recording of audio signal can be realized. Further, since the audio signal recording layer occupies only a small and shallow part of the video signal recording layer, erasing and re-recording for after-recording do not substantially affect the recorded video signal. Moreover, such an arrangement that the width of the digital signal recording track is narrower than the width of the video signal recording track is also effective to avoid influence of variation of the recording current during after-recording on the recorded video signal.

In the above description, although the multiplex recording method for recording video signal and PCM audio signal in rotary head type VTR has been described, it is needless to say that the concept of this invention can be applied to any other signals and any other magnetic recording and reproducing apparatus including such as the fixed head type VTR.

What is claimed is:

1. A method of recording and reproducing video and audio signal on video tracks on a magetic tape having a magnetic layer by using first and second magnetic heads which have different azimuths from each other and which are mounted on a rotary cylinder so that said first magnetic head first scans a predetermined video track and thereafter said second magnetic head scans the same predetermined video tracks, said method comprising the steps of:
   recording said video signal on said predetermined video track by said first magnetic head so that said first signal is recorded to extend to a substantial depth in said magnetic layer;
   recording said audio signal on said predetermined video track by said second magnetic head, wherein said second magnetic head has a gap length which is shorter than that of said first magnetic head so that said audio signal is recorded in a shallower part of said magnetic layer throughout said predetermined video track, said video signal remaining in said magnetic layer at a part below said shallower part; and
   reproducing said video and audio signals overlapping on said predetermined video track by said first and second magnetic heads, respectively.

2. A method according to claim 1, wherein said video signal is an analog video signal and said audio signal is a digital audio signal.

3. A method according to claim 2, wherein said digital audio signal is amplitude-modulated and is allocated in a frequency band which is higher than a frequency band of said analog video signal.

4. A method according to claim 2, wherein said digital audio signal is frequency-modulated and is allocated in a frequency band which is within a frequency band of said analog video signal.

5. A method according to claim 2, wherein said digital audio signal is frequency-modulated and is allocated in a frequency band which is higher than a frequency band of said analog video signal.

6. A method according to claim 2, wherein said digital audio signal is a pulse-code-modulated audio signal.

7. A method according to claim 6, further comprising a step of amplitude-modulating said pulse-code-modulated audio signal before recording said audio signal.

8. A method accordign to claim 6, further comprising a step of frequency-modulating said pulse-code-modulated audio signal before recording said audio signal.

9. A method according to claim 1, further comprising the steps of frequency-modulating a luminance signal of said video signal, and converting a frequency band of a chrominance signal of said video signal to a low frequency band, before recording said video signal.

10. A method according to claim 1, wherein a gap width of said second magnetic head is narrower than a gap width of said first magnetic head so that a width of said shallower part is narrower than a width of said predetermined track.

11. A method according to claim 1, further comprising the steps of erasing the recorded audio signals by an erase head, and recording another audio signal in said shallower part by said second magnetic head, while leaving the recorded video signal unchanged.

12. A method of recording and reproducing video and audio signals on video tracks on a magnetic tape having a magnetic layer by using first and second magnetic heads which have different azimuths from each other and which are mounted on a rotary cylinder so that said first magnetic head first scans a predetermined video track and thereafter said second magnetic head scans the same predetermined video track, said method comprising the steps of:

recording said video signalon said predetermined video track by said first magnetic head which is supplied with a first recording current so that said video signal is recorded to extend to a substantial depth in said magnetic layer;

recording said audio signal on said predetermined video track by said second magnetic head which is supplied with a second recording current which is smaller than said first recording current so that said audio signal is recorded in a shallower part of said magnetic laye throughout said predetermined video track, said video signal remaining in said magnetic layer at a part below said shallower part; and reproducing said video and audio signals overlapping on said predetermined video track by said first and second magnetic heads, respectively.

13. A method according to claim 12, wherein said video signal is an analog video signal and said audio signal is a digital audio signal.

14. A method according to claim 13, wherein said digital audio signal is amplitude-modulated and is allocated in a frequency band which is higher than a frequency band of said analog video signal.

15. A method according to claim 13, wherein said digital audio signal is frequency-modulated and is allocated in a frequency band which is within a frequency band of said analog video signal.

16. A method according to claim 13, wherein said digital audio signal is frequency-modulated and is allocated in a frequency band which is higher than a frequency band of said analog video signal.

17. A method according to claim 13, wherein said digital audio signal is a pulse-code-modualted audio signal.

18. A method according to claim 17, further comprising a step of amplitude-modulating said pulse-code-modulated audio signal before recording said audio signal.

19. A method according to claim 17, further comprising a step of frequency-modulating said pulse-code-modulated audio signal before recording said audio signal.

20. A method according to claim 12, further comprising the steps of frequency-modulating a luminance signal of said video signal, and converting a frequency band of a chrominance signal of said video signal to a low frequency band, before recording said video signal.

21. A method according to claim 12, wherein a gap width of said second magnetic head is narrower than a gap width of said first magnetic head so that a width of said shallower part is narrower than a width of said predetermined track.

22. A method according to claim 12, further comprising the steps of erasing the recorded audio signal by an erase head, and recording another audio signal in said shallower part by said second magnetic head, while leaving the recorded video signal unchanged.

* * * * *